United States Patent [19]

Swenson et al.

[11] 3,994,469

[45] Nov. 30, 1976

[54] SEAT SUSPENSION INCLUDING IMPROVED DAMPING MEANS

[75] Inventors: Richard F. Swenson; John J. Gryga, Jr., both of Milwaukee, Wis.

[73] Assignee: Milsco Manufacturing Company, Milwaukee, Wis.

[22] Filed: Dec. 18, 1975

[21] Appl. No.: 642,129

[52] U.S. Cl. .................... 248/400; 248/421
[51] Int. Cl.² ................ A45D 19/04; A47J 47/16
[58] Field of Search .......... 248/371, 372, 379, 399, 248/400, 429, 162, 421; 297/345, 347, 348

[56] References Cited
UNITED STATES PATENTS

| | | | |
|---|---|---|---|
| 2,840,140 | 6/1958 | Harrington | 248/400 X |
| 3,150,855 | 9/1964 | Carter et al. | 248/400 |
| 3,215,386 | 11/1965 | Swenson | 248/400 |
| 3,412,967 | 11/1968 | Swenson et al. | 248/400 |
| 3,608,855 | 9/1971 | Osenberg | 248/400 |
| 3,727,974 | 4/1973 | Swenson et al. | 248/399 X |
| 3,787,025 | 1/1974 | Sturhan | 248/399 |
| 3,913,975 | 10/1975 | Carter | 248/399 |

FOREIGN PATENTS OR APPLICATIONS

| | | | |
|---|---|---|---|
| 1,187,504 | 2/1965 | Germany | 248/400 |
| 1,160,185 | 7/1969 | United Kingdom | 248/399 |
| 774,129 | 5/1957 | United Kingdom | 248/399 |

*Primary Examiner*—Lawrence J. Staab
*Attorney, Agent, or Firm*—James E. Nilles

[57] ABSTRACT

A seat suspension system for use on a tractor or the like including an air bag means for resiliently supporting a seat and a shock absorber positioned generally vertically but at an incline between the seat and a base frame and functioning to dampen the vertical oscillation of the seat. The shock absorber is pivotably supported to permit variation in its inclination and consequent variation in its damping effect on the relative vertical motion of the seat. A readily accessible adjusting means is provided for changing the relative inclination of the shock absorber and includes a pivotable bellcrank positioned beneath the front portion of the seat and having one lever arm connected to the upper end of the shock absorber. The other lever arm of the bellcrank is accessible to the tractor operator to permit pivotal movement of the bellcrank.

7 Claims, 5 Drawing Figures

SEAT SUSPENSION INCLUDING IMPROVED DAMPING MEANS

BACKGROUND OF THE INVENTION

The present invention relates to seat suspension systems having an air bag or fluid spring suspension means for resiliently supporting the seat and including damping means for controlling the vertical movement of the seat.

Examples of the prior art devices of the type referred to and to which the present invention relates are shown in U.S. Pat. No. 3,727,974, issued Apr. 17, 1973 to Swenson et al. and U.S. Pat. Application, Ser. No. 550,418, filed Feb. 18, 1975 by Swenson et al.

SUMMARY OF THE INVENTION

The present invention provides a seat suspension system which includes an improved, more readily accessible and convenient means for adjusting the effect of the damping means used in the suspension.

The seat suspension system is generally comprised of a base frame assembly which is rigidly secured to a tractor or the like and which supports a seat supporting frame. A pair of parallel linkages are pivotably mounted to both sides of the base frame and to the seat supporting frame to permit vertical movement of the seat supporting frame with respect to the base frame, and an air bag or fluid spring is disposed between the base frame and the seat supporting frame to provide resilient support for the seat. In order to dampen the effects of the air bag and to control the movement of the seat, a shock absorber is disposed between the base frame and the seat supporting frame and generally vertically but at an incline. The lower end of the shock absorber is pivotally supported and the upper end of the shock absorber is secured to one end of a lever arm of a bellcrank which is in turn pivotally secured to the seat supporting frame. The other end of the bellcrank extends forwardly from under the seat so as to be readily accessible to the tractor operator. The upper end of the shock absorber is also received in slideable relationship in a track such that pivotal movement of the bellcrank by the operator will cause variation in the relative inclination of the shock absorber and consequent variation in its damping effect upon the vertical movement of the seat. The forwardly extending arm of the bellcrank also includes locking means such that the relative pivotal position of the bellcrank can be regulated.

DESCRIPTION OF THE PREFERRED EMBODIMENT

Figures 1, 2:
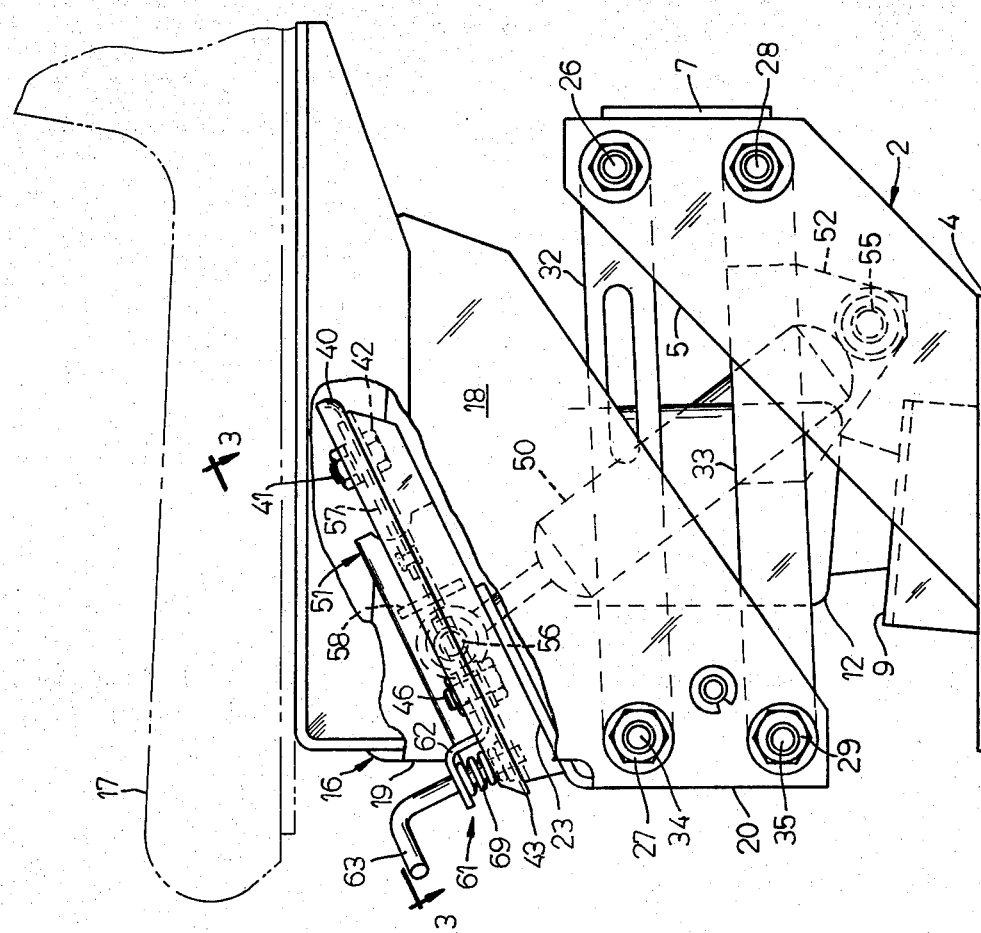
FIG. 1 is a side elevation view of the seat suspension means of the present invention with portions broken away in the interest of clarity.
FIG. 2 is an end elevation view of the suspension means shown in FIG. 1 also with portions broken away for the sake of clarity.

The seat suspension system of the present invention generally comprises means for resiliently supporting a seat on a tractor or other like vehicles and finds particular utility when used with vehicles that are operated over rough and uneven terrain which causes the operator to be subjected to a rough ride. The suspension system includes a base frame 2 which can be rigidly secured to the tractor which is not shown in the drawings. The base frame 2 includes a base plate 4 to which are welded a pair of laterally spaced and upwardly extending plate members 5 and 6 best shown in FIG. 2. The plate members 5 and 6 are rigidly connected together by a rear plate 7 welded to both of the plate members 5 and 6. The base frame 2 also includes a generally U-shaped upwardly extending air spring platform 9 welded thereto and provided to support the lower end of an air bag 12 which is also commonly known as a fluid spring. The seat suspension system further includes a seat frame generally shown as element 16 for supporting a seat 17. More specifically, the seat frame 16 is comprised of a generally U-shaped member having fore and aft extending walls 18 and 19 positioned generally parallel to the plate members 5 and 6, respectively. The seat frame 16 also includes a front transverse wall 20 extending between the walls 18 and 19 and formed integrally therewith. Transverse wall 20 includes a lower generally vertical portion and an upper rearwardly inclined portion 23.

The seat frame 16 is supported by and vertically mounted relative to the base frame 2 by parallel arms or links 30, 31, 32 and 33. The upper arms 30 and 32 are pivotally mounted at their rearward ends to the base frame 2 by the bolt and shaft means 26 and the lower arms 31 and 33 are similarly pivotally mounted at the rearward ends by bolt and shaft means 28. The parallel arms 30-33 are also pivotally mounted at their front ends to the walls 18 and 19 of the seat frame 16 by bolt and shaft means 27 and 29. The seat 17 is thus vertically positioned relative to the base frame 2 by means of the parallel arm arrangement and can be maintained by this arrangement at a constant attitude with respect to the base regardless of the height of the position of the seat.

The air bag 12 functions to control the relative vertical position of the seat 17 and is secured at its upper end to the seat frame 16. A source of air pressure (not shown) is connected to the lower end of the air bag and the air pressure applied to the air bag 12 functions to control the height of the seat and the resiliency of the air bag. The specific operation of the means for controlling the air pressure applied to the air bag 12 is not the subject of the present invention and therefore will not be described further. However, an example of such control means is more specifically recited in U.S. Pat. Application, Ser. No. 550,418, filed Feb. 18, 1975, by Swenson et al.

A conventional fluid shock absorber 50 is pivotally supported at its lower end by the parallel arm 31 and is slideably supported at its upper end in a guide track 51 which is secured to the seat frame 16. The shock absorber 50 acts in cooperative relationship with the air bag 12 to provide a cushioning action for the seat in order to control the vertical velocity and acceleration of the seat, and to limit or dampen the resiliency of the air bag. As best shown by reference to FIG. 1, the amount of damping action provided by the shock absorber can be varied by adjusting the relative inclination of the shock absorber since the more vertical the position of the shock absorber the greater its damping effect will be. Adjustment of the inclination is provided by the present invention in that the position of the upper end of the shock absorber can be varied by sliding movement of that upper end in the guide track 51. Forward movement of the upper end of the shock absorber in the track 51 will function to rotate the shock absorber toward a horizontal position, thereby decreasing its mechanical advantage and decreasing its damping effect on the relative vertical movement of the seat.

Figure 3:
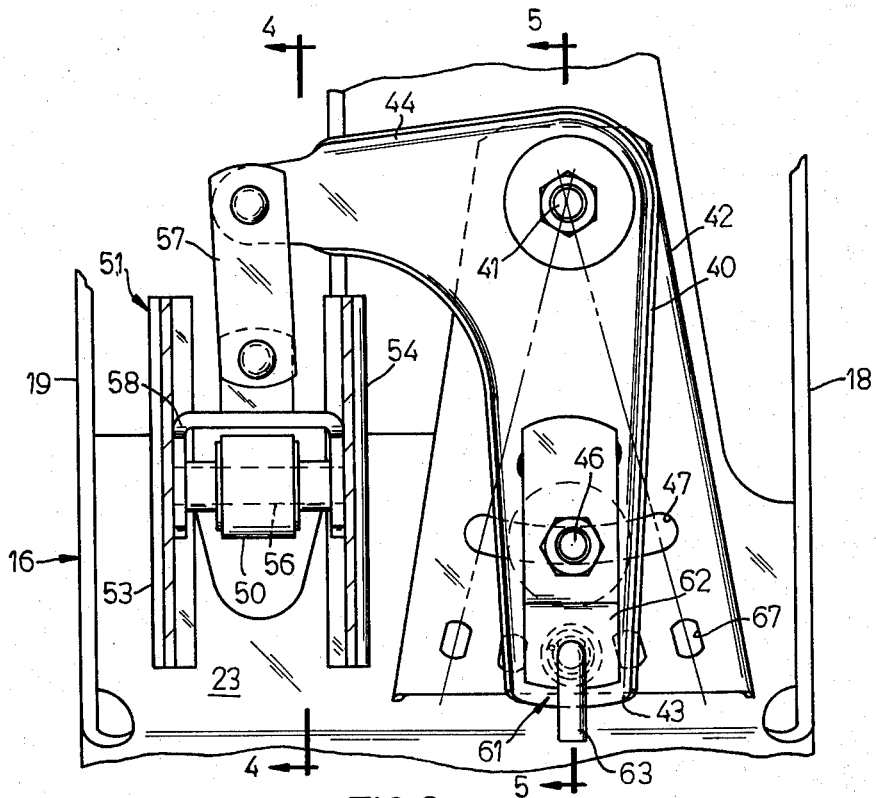
FIG. 3 is a view taken generally along the line 3—3 in FIG. 1.
Figure 4:
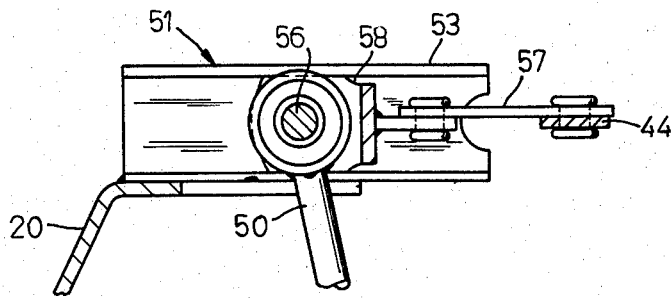
FIG. 4 is a cross-sectional view taken generally along the line 4—4 in FIG. 3.
Figure 5:
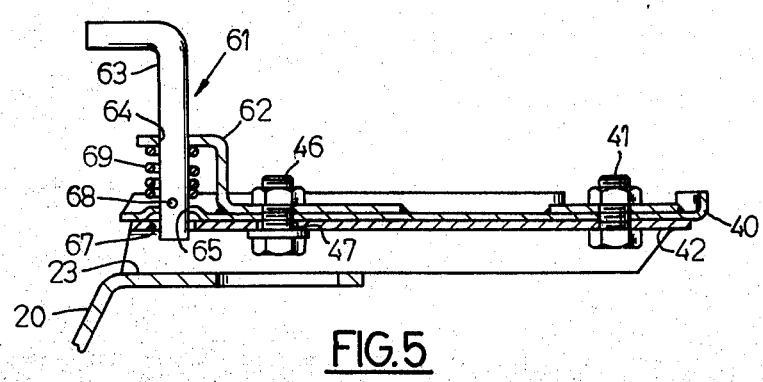
FIG. 5 is a cross-sectional view taken generally along the line 5—5 in FIG. 3.

More specifically, the shock absorber 50 is secured at its lower end to a shock absorber mounting bracket 52 which is integral with and extends downwardly from the parallel arm 31. The mounting bracket 52 includes a bore therethrough for receiving a generally horizontal stub shaft 55 which functions to pivotably but securely connect the lower end of the shock absorber 50 to the mounting bracket 52. Alternatively, the lower end of the shock absorber 50 could also be supported by the base frame 2 in a similar manner. The guide track 51, best shown in FIGS. 2—4, is comprised of a pair of parallel guide members 53 and 54, which are secured to the inclined portion 23 of the front wall 20, and which slideably receive a yoke 58 which is connected to the opposite ends of a shock absorber support shaft 56 extending through the bore in the upper end of the shock absorber 50. The guide track 51 is positioned in a plane generally normal to the longitudinal axis of the shock absorber 50 such that movement of the upper end of the shock absorber in the guide track 51 will result in only slight elongation or contraction thereof.

In order to facilitate adjustment of the position of the upper end of the shock absorber, a pivotable bellcrank 40 is provided, one end of which is operably connected to the upper end of the shock absorber and the other end of which is positioned to be readily accessible to the vehicle operator to provide a convenient means for varying the damping effect of the shock absorber. The bellcrank 40 as shown in FIGS. 1 and 2, is generally planar and lies in a plane which is substantially parallel to that of the guide track 51 and perpendicular to the longitudinal axis of the shock absorber 50. The bellcrank 40 is pivotally mounted for rotation by means of a bolt 41 extending through a bellcrank support bracket 42 and in turn rigidly secured to the inclined portion 23 of the front wall 20 and adjacent to the guide track 51. One lever arm 43 of the bellcrank 40 extends generally forwardly from under the seat 17 and functions as a lever readily accessible to the vehicle operator. The lever arm 43 is also supported at its forward end for arcuate movement with respect to the support bracket 42 by a bolt 46 extending through the lever arm 43 and slideably received in arcuate slot 47. The other lever arm 44 of the bellcrank is coplanar with but extends in a generally perpendicular direction to the first lever arm 43 and is operably connected by means of a pivotal link 57 and by means of the yoke 58 to the shock absorber support shaft 56. Pivotal movement of the lever arm 43 of the bellcrank will thus result in forward or rearward movement of the upper end of the shock absorber 50 in the guide track 51 thereby providing means for adjusting the relative angular position of the shock absorber.

A locking assembly 61 is also provided in order to fix the relative pivotal position of the bellcrank 40. The locking assembly 61 comprises an angular bracket 62 rigidly secured to one end of the lever arm 43 of the bellcrank 40 and including a bore 64 for receiving a locking pin 63. The locking pin 63 extends through the bore 64 and also through an aligned bore 65 located in the end of the lever arm 43 and the lower end of the locking pin can be received in any of a plurality of positioning bores 67 provided in the bellcrank support bracket 42. The locking pin 63 also includes a retaining ring 68 secured thereto such that a spring 69 can be received between the lower surface of the bracket 62 and the retaining ring 68 whereby the locking pin 63 can be biased into engagement with the bores 67 in the support bracket 42.

In operation, if the vehicle operator desires to adjust the damping effect of the shock absorber 50, he may easily reach forwardly to pull upwardly on the locking pin 63 thereby disengaging it from the bores 67 such that he can pivot the bellcrank 40 to adjust the position of the upper end of the shock absorber.

Resume

The present invention thus provides an improved means for mounting a shock absorber in a seat suspension system such that the damping effect of the shock absorber can be easily adjusted. The adjusting mechanism also provides a convenient and readily accessible means for regulating the function of the shock absorber and provides a convenient and effective means for locking the adjusting mechanism in the desired position.

We claim:

1. A seat suspension system comprising, a base frame, a seat supporting frame located above said base frame, means interconnecting said frames for vertically positioning said seat supporting frame relative to said base frame, said frames having a front side, and a damping means supported from said base frame and including a longitudinal axis extending generally upwardly and at an incline thereto toward said front side, and a lever means having a pivotal connection with said seat supporting frame and having one arm connected to an upper end of said damping means, said lever means also having a second arm which is accessible from said front side of said frames and whereby an operator can swing said lever means about its said pivotal connection to thereby vary the angle of inclination of said damping means and consequently vary the damping effect on vertical movement of said seat supporting frame, said first arm and said second arm lying in a plane generally normal to the longitudinal axis of said damping means and said lever means being pivotable about an inclined axis generally parallel to said longitudinal axis.

2. A seat suspension system according to claim 1 including locking means operatively connected between said lever means and said seat supporting frame to selectively lock said lever means in an adjusted position.

3. The suspension system set forth in claim 1 further characterized in that said means interconnecting said frames comprises a plurality of parallel arms connected between said frames.

4. The seat suspension system set forth in claim 1 further including a pivotal link having one end connected to an end of said one arm and having its other end connected to said upper end of said damping means.

5. The seat suspension system set forth in claim 1 further including a guide means for slideably receiving said upper end of said damping means for generally frontward and rearward reciprocating movement in response to pivotal movement of said lever means.

6. The seat suspension system set forth in claim 1 further including guide means supported by said seat supporting frame and lying in an inclined plane generally normal to the longitudinal axis of said damping means, said guide means slideably supporting said upper end of said damping means whereby said upper end moves linearly.

7. A seat suspension system comprising a base frame, a seat supporting frame located above said base frame, means interconnecting said frames for vertically positioning said seat supporting frame relative to said base frame, said frames having a front side, a damping means supported from said base frame and having a longitudinal axis extending generally upwardly and at an incline thereto toward said front side, guide means for slideably receiving an upper end of said damping means, said guide means being positioned at an incline and lying in a plane generally normal to the longitudinal axis of said damping means, a bellcrank means having a pivotal connection with said seat supporting frame and having one arm connected to an upper end of said damping means, said bellcrank also having a second arm which is accessible from said front side of side frames and whereby an operator can swing said bellcrank about its said pivotal connection to thereby vary the angle of inclination of said damping means and consequently vary the damping effect on vertical movement of said seat supporting frame, said first and second arm lying in a plane generally normal to the longitudinal axis of said damping means and said bellcrank being pivotable about an axis generally parallel to said longitudinal axis.

* * * * *